United States Patent
Jan et al.

[19]

[11] Patent Number: 6,163,969
[45] Date of Patent: Dec. 26, 2000

[54] 3D LASER LEVELER

[75] Inventors: Der-Shyang Jan, Taipei; Tony Kuo-Ti Chen, Ping-Chen, both of Taiwan

[73] Assignee: Quarton Inc., Taipei Hsien, Taiwan

[21] Appl. No.: 09/517,394

[22] Filed: Mar. 2, 2000

Related U.S. Application Data

[63] Continuation of application No. 09/129,455, Aug. 4, 1998, abandoned.

[51] Int. Cl.$^7$ ........................................... G01C 9/00
[52] U.S. Cl. ................... 33/282; 33/286; 33/451; 33/371
[58] Field of Search ................. 33/275 R, 281, 33/282–286, 227, 228, 370, 371–373, 451, DIG. 21

[56] References Cited

U.S. PATENT DOCUMENTS

| | | | |
|---|---|---|---|
| 4,566,202 | 1/1986 | Hamar | 33/286 |
| 4,976,040 | 12/1990 | Mish et al. | 33/372 |
| 5,505,000 | 4/1996 | Cooke | 33/286 |
| 5,539,990 | 7/1996 | Le | 33/283 |
| 5,594,993 | 1/1997 | Tager et al. | 33/DIG. 21 |
| 5,660,470 | 8/1997 | Mench | 33/286 |
| 5,813,125 | 9/1998 | Byrn | 33/451 |
| 5,864,956 | 2/1999 | Dong | 33/286 |
| 5,907,907 | 6/1999 | Ohtomo et al. | 33/281 |
| 6,009,630 | 1/2000 | Rando | 33/286 |
| 6,012,229 | 1/2000 | Shiao | 33/282 |

*Primary Examiner*—Christopher W. Fulton
*Assistant Examiner*—Quyen Doan
*Attorney, Agent, or Firm*—Raymond Sun

[57] ABSTRACT

A 3D laser leveler is provided for accurately locating distant parallel or extension lines. The 3D laser leveler has a base block and a rotator. The base block provides a base plane for resting upon a flat surface when in use, a first leveling unit for examining the leveling status of the base plane, and a pivot mechanism. The rotator is rotatably connected to the base block and rotatable around the pivot mechanism, and includes a housing for providing an internal accommodating space, a battery set and a laser unit received inside the accommodating space. The laser unit uses power provided by the battery set for generating a spanning plane laser beam that can be utilized to locate a spatial extension or a perpendicular line. In addition, a joining bracket can be included separately to connect the 3D laser leveler and a conventional beam leveler.

13 Claims, 6 Drawing Sheets

3D LASER LEVELER

RELATED CASES

This is a continuation of co-pending Ser. No. 09/129,455, entitled "3D Laser Leveler", filed Aug. 4, 1998now abandoned, the entire disclosure of which are incorporated by this reference as though set forth fully herein.

BACKGROUND OF THE INVENTION (1) Field of the Invention

The invention relates to a 3D laser leveler, and more particularly to a spatial level extension apparatus.

(2) Description of the Prior Art

In the construction industry, drawing or determining a distant horizontal or vertical line from a reference line is sometimes not easy to achieve in one step, especially for those desired lines located at different elevations. Conventional methods for carrying out the line-drawing or line-determination operation can be performed by utilizing rulers, ink-string boxes, levelers, and so on as are well well-known in the art.

During the operation, a reference line is first selected. The reference line can be corner lines, fence lines, or any horizontal or vertical line defined by a square-beam leveler or other device. Then, a first extension line of the reference line can be defined by using rulers or an ink-string box. When using a first ruler to draw the first extension line, one side of the first ruler is used to be aligned with the reference line and the first extension line can be formed by using a second ruler as an extension of the first ruler to elongate the reference line.

The conventional ink-string box comprises a box for carrying a roller at one half and ink at another half. The roller is pivoted on top of the box, and an extension string rolled around the roller. The extension string has a free end that is pulled over the ink and away from the box. While applying the ink-string box to draw the first extension line of a reference line, the string is pulled out from the roller and mixed with the ink during the pulling operation, then aligned with the reference line, and then the first extension line is formed by flipping the extended inked string to drop the ink lengthwise.

After the first extension line is determined, additional extension lines may still be needed for extending the first extension line to another direction or to another elevation, depending upon where the desired lines are located. As long as all extension lines are defined, the-desired line can be determined by a ruler, an ink-string box, or any tool that can be used to form a straight line.

Obviously, the aforesaid conventional methods that determine a desired line by using extension lines may sometimes be tedious and difficult to achieve accurately, and may be subject to human error.

Thus, there remains a need for a line-extension tool that provides accurate extension ability and is effective for use in distances of all ranges, yet is easy to use and can be used quickly and efficiently.

SUMMARY OF THE INVENTION

Accordingly, it is an object of the present invention to provide a 3D laser leveler, which can be used in accurately extending or forming a desired line from a reference line in many applications.

It is yet another object of the present invention to provide a 3D laser leveler which can be provided with a conventional beam leveler for enhancing the measurement capability of the leveler.

It is a further object of the present invention to provide a convenient 3D laser leveler, which is convenient to use and which can be used for a wide variety of distances.

The 3D laser leveler in accordance with the present invention has a base block and a rotator pivoted onto the base block.

The base block provides a base plane for resting upon a flat surface when in use, a first leveling unit for examining the leveling status of the base plane, and a part of a pivot mechanism with a center line parallel to and located at a distance above the base plane. The base plane can further include at least one straight edge for defining a reference line for measurement.

The rotator is rotatably connected with the base block via another part of the pivot mechanism and is rotatable around the pivot mechanism. The rotator includes a housing, a battery set, and a laser unit.

The housing provides an internal accommodating space for installing the battery set and the laser unit, a plurality of through holes for accessing the internal accommodating space from the exterior of the housing, and the part of the pivot mechanism for engaging the corresponding part of the pivot mechanism of the base block.

The battery is provided inside the internal accommodating space, and is replaceable through one of through holes. In one embodiment of the present invention, the battery set can further include a battery cover to block the opening of the through hole for providing better protection of the battery set inside the housing.

According to the present invention, the laser unit uses power provided by the battery set and is located inside the internal accommodating space via another through hole for generating a spanning plane laser beam that is perpendicular to the center line of the pivot mechanism. The spanning plane laser beam exits the rotator through the yet another through hole. In one embodiment of the laser unit, the spanning plane laser beam can be perpendicular to the base plane of the base block for locating a spatial extension line. In another embodiment of the laser unit, the spanning plane laser beam can be rotatable with the rotator to a position parallel to the base plane for locating spatial parallel lines.

In one embodiment of the present invention, the first leveling unit can be a spirit bubble located on top of the base block.

In one embodiment of the 3D laser leveler, the rotator can further include a second leveling unit for examining the leveling status of the center line. The second leveling unit can be a spirit bubble located on the housing.

In one embodiment of the 3D laser leveler, the laser unit can further include a switch for controlling ON/OFF of the power from the battery set. The switch is accessible from the exterior of the housing through one of the through holes, and can further have an additional switch cap placed on top of the switch.

In the present invention, a joining bracket can be included separately as an accessory of the 3D laser leveler, for connecting the 3D laser leveler to other apparatus; such as a beam level, a construction beam, or any other suitable object. The joining bracket has an upper groove for receiving the base block of the 3D laser leveler and a lower groove for clamping a beam leveler. The upper groove can include an adjustable holding mechanism for adjusting the position of the 3D laser leveler on the joining bracket. The lower groove can include a vice mechanism for firmly clamping the joining bracket onto an object such as the beam leveler.

In one embodiment of the present invention, the holding and the vice mechanisms can be adjustable screws, that can be threadably adjusted by a user.

In one embodiment of the joining bracket, the joining bracket can have an H-shape cross section.

In another embodiment of the joining bracket, the H-shape beam can further include an inward flange at one side of the lower groove, with the inward flange further including a plurality of vertical through holes for receiving adjustable screws.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a 3D laser leveler. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
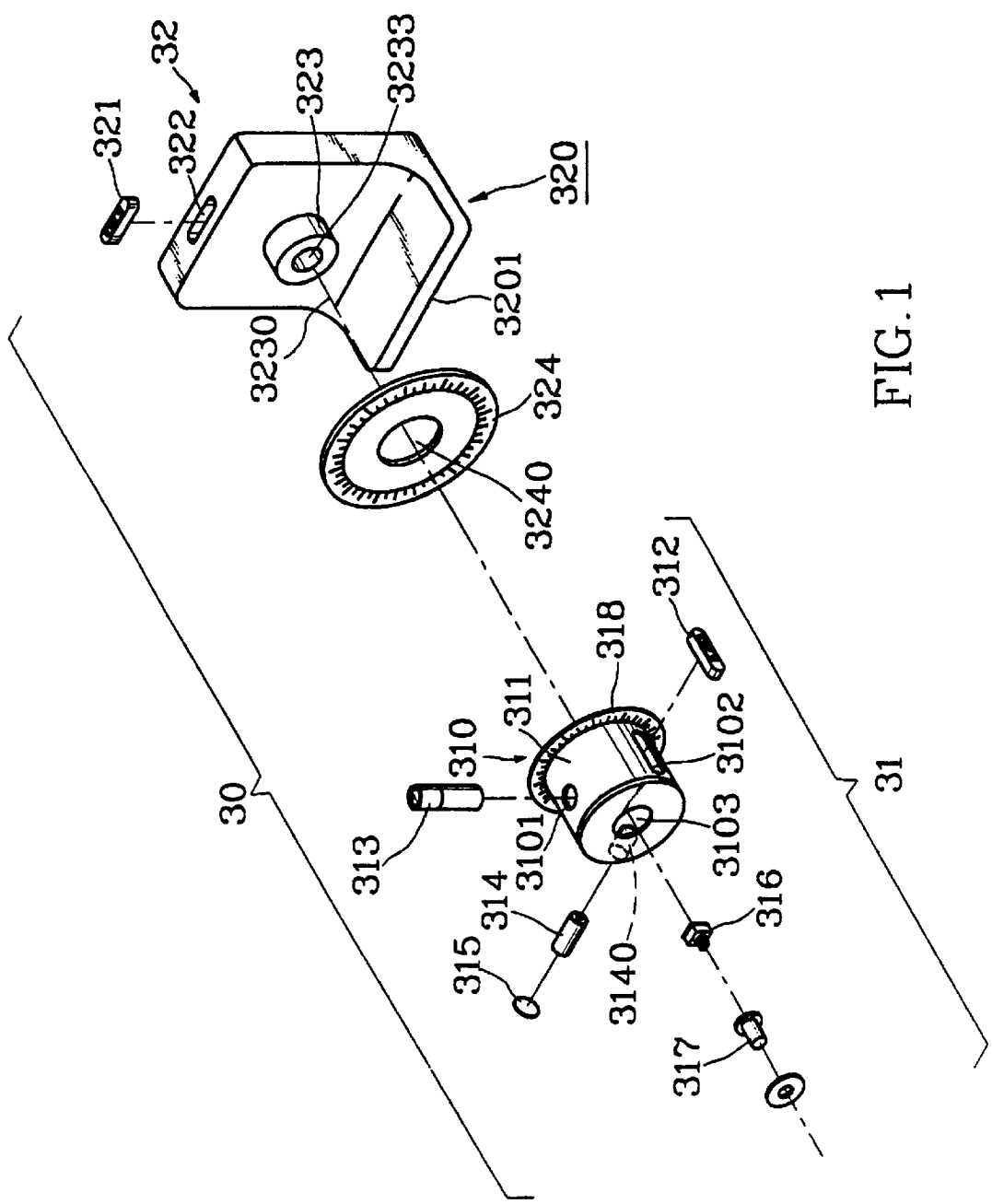
FIG. 1 is a perspective exploded view of a 3D laser leveler in accordance with the present invention.

Referring now to FIG. 1, the 3D laser leveler 30 in accordance with the present invention has a base block 32 and a rotator 31.

The base block 32 provides a base plane 320 which can be rested upon a flat surface when in use, a first leveling unit for examining the leveling status of the base plane 320, and a horizontally cylindrical extension 323 as part of the pivot mechanism to connect with the rotator 31. The cylindrical extension 323 has a bore 3233 and a center line 3230 parallel to and located a distance above the base plane 320 to provide enough clearance for allowing the rotator 31 to freely rotate about the cylindrical extension 323. Preferably, the base plane 320 further includes at least a straight edge 3201 defining a reference line for measurement.

As shown in FIG. 1, the first leveling unit of the base block 32 can be a first conventional spirit bubble 321 located in the top of the base block 32 in a top bubble cavity 322 thereof, and exposed to exterior view.

The rotator 31 rotatably connected with the base block 32 via the pivot mechanism includes a housing 311, a battery set 314, and a laser unit 313. The rotator 31 is.

Figure 5:
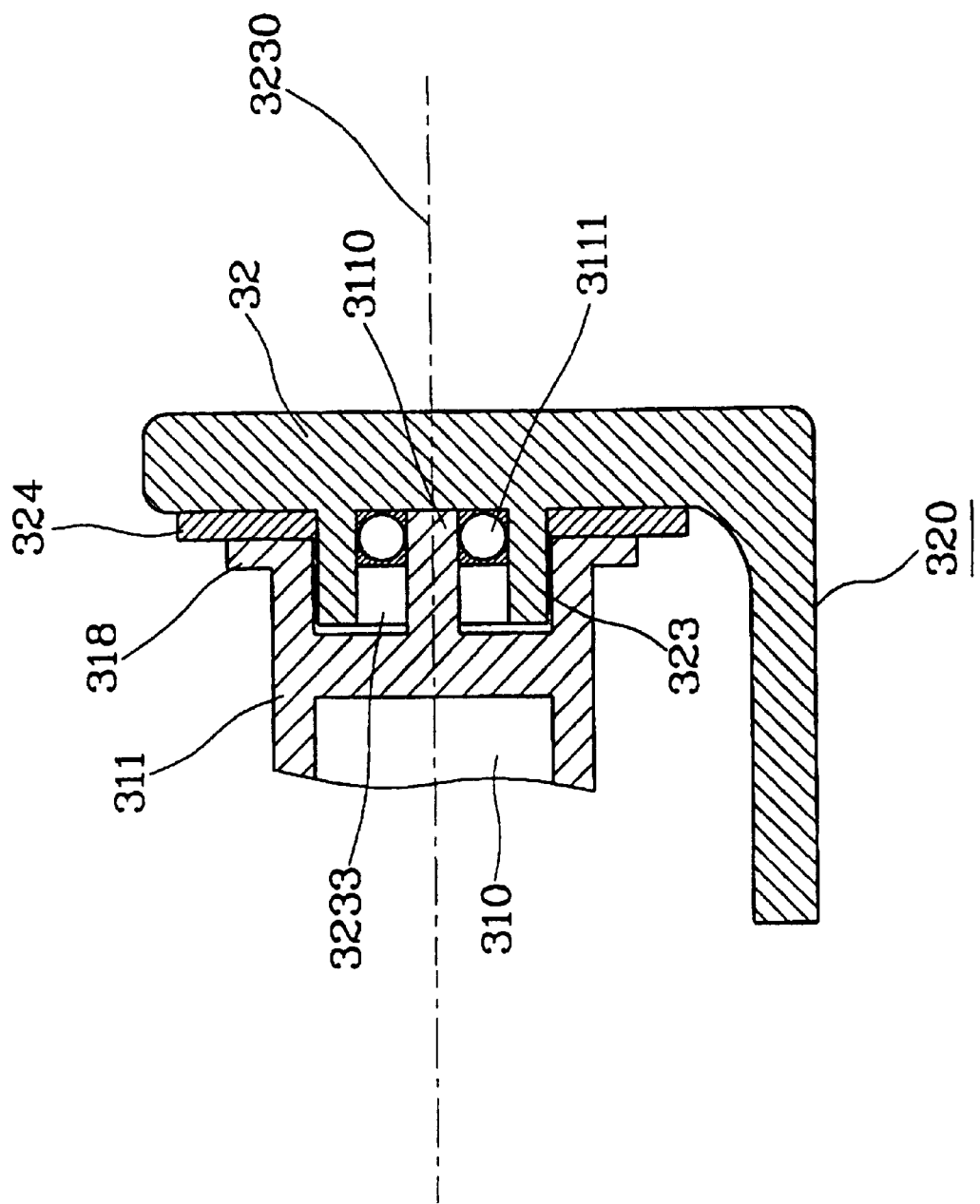
FIG. 5 is a cross sectional view of the 3D laser level showing one embodiment of the pivot mechanism to couple the base block and the rotator.

The housing 311 according to the present invention provides an internal accommodating space 310 for installing the battery set 314 and the laser unit 313, a plurality of through holes for accessing the internal accommodating space 310 from the exterior of the housing 311, and a shaft 3110 located at the side close to the base block 32 as another part of the pivot mechanism to be received inside the bore 3233 of the cylindrical extension 323 of the base block 32, as shown in FIG. 5. In addition, a bearing 3111 can be further included in the bore 3233 to couple the shaft 3110 and the cylindrical extension 323.

As shown in FIG. 1, the battery set 314 of the present invention is provided inside the internal accommodating space 310 and is replaceable through a battery through hole 3140. As shown in FIG. 1, the battery set 314 can further include a battery cover 315 to block the opening of the battery through hole 3140 for providing better protection of the battery set 314 inside the housing 311.

According to the present invention, the laser unit 313 uses power provided by the battery set 314 and is located in the internal accommodating space 310 via a fourth through hole 3101 (also one of the through holes on the housing 311). The laser unit 313 is used for generating a spanning plane laser beam so that the middle laser ray of the spanning plane laser beam (i.e. the laser ray located at the middle line of the spanning plane) is perpendicular to the center line 3230 of the cylindrical extension 323 and so that the spanning plane laser beam exits the rotator 31 through the fourth through hole 3101. In one embodiment of the laser unit 313, the spanning plane laser beam can be perpendicular to the base plane 320 of the base block 32, for locating a spatial extension line. In another embodiment of the laser unit 313, the spanning plane laser beam can be rotatable with the rotator 31 to a position parallel to the base plane 320, for assessing spatial parallel lines. In addition, the laser unit 313 can be a conventional laser unit that is commercially-available in the industry.

According to the present invention, the 3D laser leveler 30 can have a second leveling unit for examining the leveling status of the center line 3230. As shown in FIG. 1, the second leveling unit can be a second conventional spirit bubble 312 located in an exposed side bubble cavity 3102 on the housing 311.

As shown in FIG. 1, the laser unit 313 can further include a switch 316 capable of controlling ON/OFF of the power supplied from the battery set 314, in such a manner that the switch 316 is electrically connected in series with the battery set 314 as well as the laser unit 313 so that pressing on the switch 316 will cause the switch 316 to push the battery set 314 against the laser unit 313 to form the series connection. The switch 316 is provided inside the accommodating space 310 and is accessible from the exterior of the housing 311 through a fifth through hole 3103 of the housing 311, and can further have an additional switch cap 317 to be placed on top of the switch 316. A portion of the switch cap 317 protrudes from the housing 311 via the fifth through hole 3103 for providing better accessibility of the switch 316 from the outside of the housing 311. In other words, the user can conveniently press the switch cap 317 to cause the switch 316 to push the battery set 314 against the laser unit 313 to form the series connection.

According to the present invention, the rotator 31, which includes the housing 311, the laser unit 313, the battery set 314, the second spirit bubble 312, and the switch 316 as well as the switch cap 317, are rotatable as an entire unit with respect to the cylindrical extension 323 of the base block 32.

In addition, a scaling skirt 318 can be provided at one end of the housing 311 facing the base block 32. A separate scale plate 324 can have markings providing thereon to indicate the scale readings of the rotation of the rotator 31, and has an opening 3240 through which the cylindrical extension 323 can extend. The scale plate 324 can be supported by the cylindrical extension 323 for rotation thereabout, and can be sandwiched between the base block 32 and the scaling skirt 318.

In the application of the 3D laser leveler 30, the base plane 320 is rested on a horizontal surface, and the position of the 3D laser leveler 30 can be adjusted by examining the first and the second spirit bubbles 321. The rotator 31 can then be carefully rotated and aligned with a reference line. After properly adjusting the 3D laser leveler 30, the spanning plane laser beam is emitted from the laser unit 313 and is used to locate a desired distant line.

Figure 2:
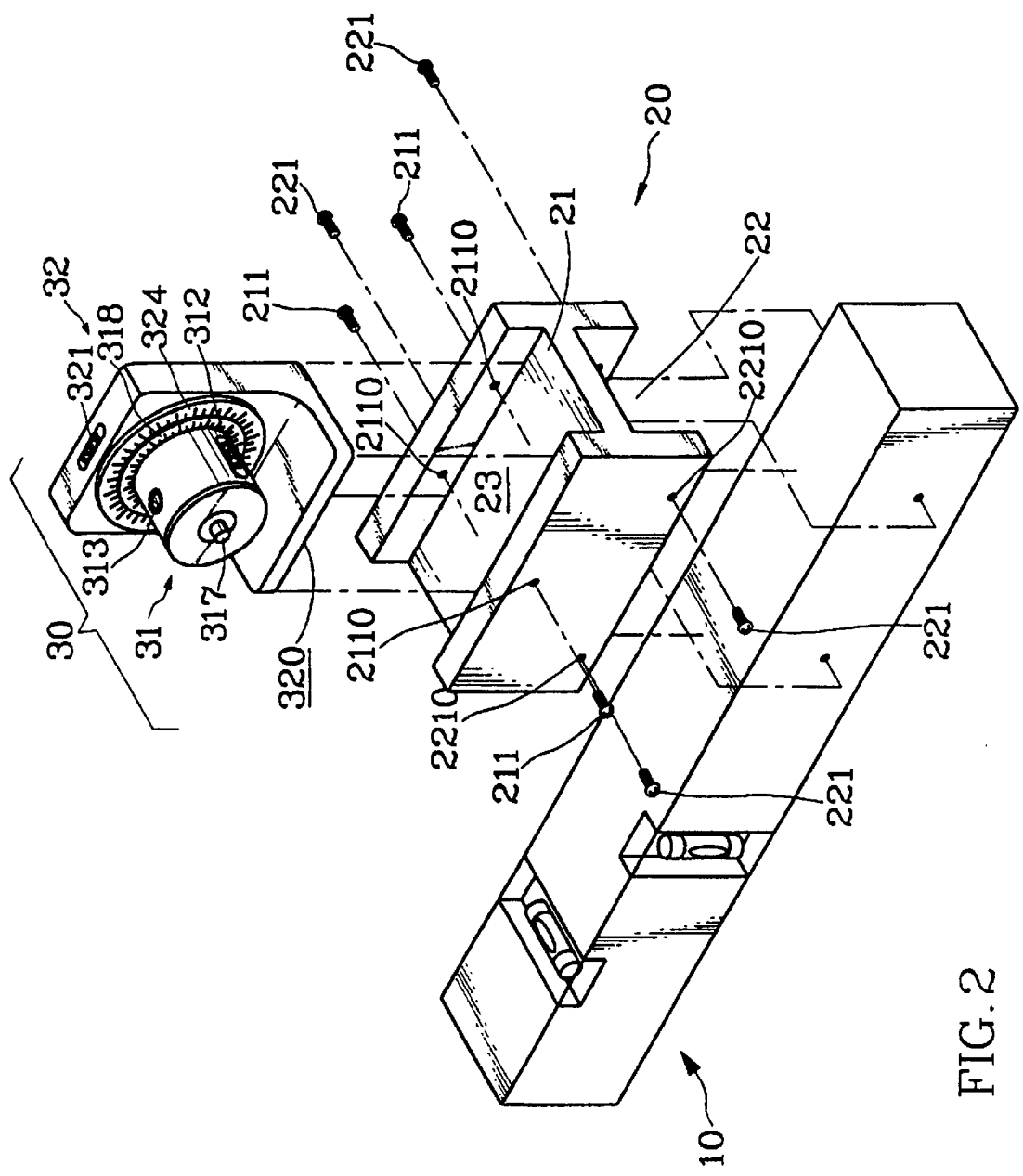
FIG. 2 is a perspective exploded view of the combination of the 3D laser leveler of FIG. 1, a joining bracket in accordance with the present invention, and a conventional beam leveler.

Referring now to FIG. 2, a joining bracket 20 can be included separately as an accessory of the 3D laser leveler 30, for connecting the 3D laser leveler 30 to other apparatus; such as a conventional beam leveler 10 as shown, a construction beam, or any other suitable object. The beam leveler 10 can be any conventional beam leveler and will not be described in greater detail. The beam leveler 10 operates to provide the 3D laser leveler 30 with a flat plane or support on which it can be aligned and used. The joining bracket 20 can be a beam having an upper groove 21 for receiving the base block 32 of the 3D laser leveler 30 and a lower groove 22 for clamping the beam leveler 10. The upper groove 21 provides a flat surface or plane 23 on which the base block 32 can rest, and includes an adjustable holding mechanism for calibrating the position of the 3D laser leveler 30 on the joining bracket 20. In particular, the joining bracket 20 can have an H-shape cross section, in which the H-shape beam provides the upper and the lower grooves 21 and 22 at the upper and the lower cavities of the H shape, respectively. The holding mechanism can be a plurality of first adjustable screws 211 located at the sides of the upper groove 21 via a plurality of corresponding first through screw holes 2110.

The position of the base block 32 can be adjusted through the first adjustable screws 211 which extend through corresponding through screw holes 2110 in the side walls of the upper groove 21. Each screw 211 has an inner end that extention to the upper groove 21 for connecting the base block 32, and an opposing outer end that extends outside the joining bracket 20 for manipulation by a user. The adjustment can be accomplished by turning the outer ends of the screws 211 to cause the inner ends to apply more or less pressure against the base block 32.

The lower groove 22 can include a vice mechanism for firmly clamping the joining bracket 20 onto the beam leveler 10. As shown in FIG. 2, the vice mechanism can also be a plurality of second adjustable screws 221 located at sides of the lower groove 22 via a plurality of corresponding second through screw holes 2210. The second adjustable screws 221 can also be threadably adjusted by a user in the same manner as the first adjustable screws 211.

Figure 3:
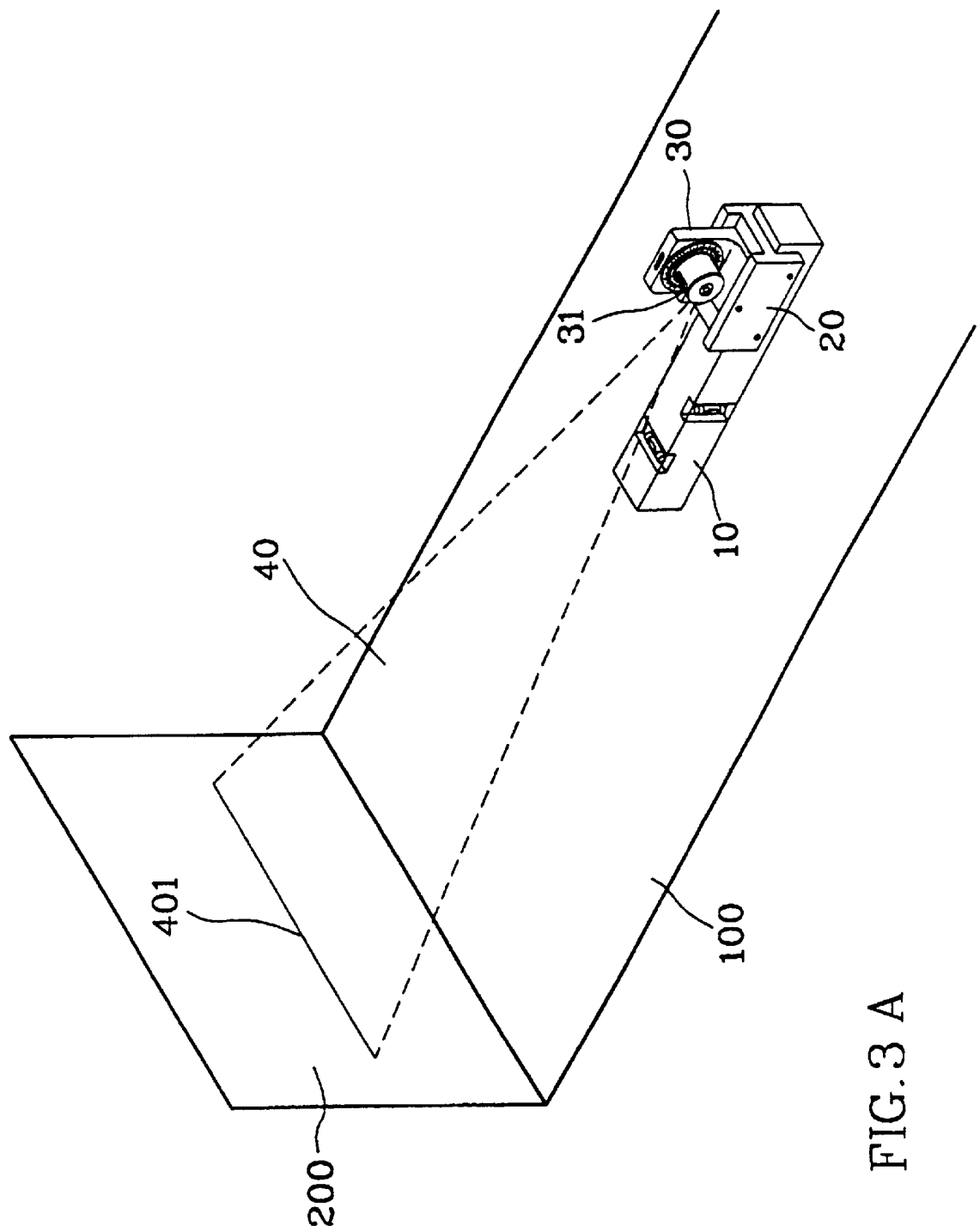
FIG. 3A illustrates an application of the combination of FIG. 2 in defining a horizontal line on a distant vertical surface.
FIG. 3B illustrates another application of the combination of FIG. 2 in defining a vertical line on a distant vertical surface, in which the 3D laser leveler uses a second laser beam pattern.
Figure 3:
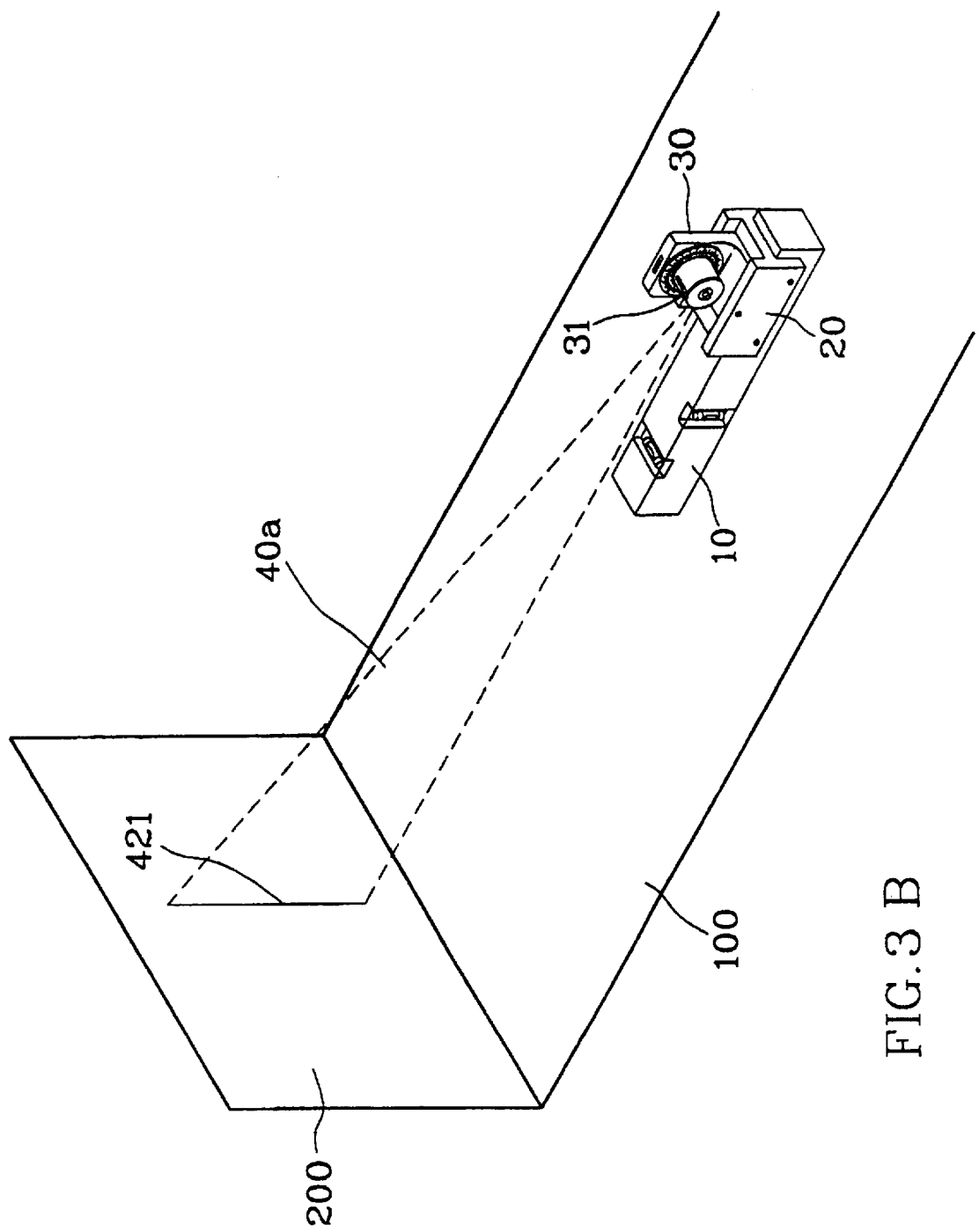

Referring now to FIG. 3A, when the combination of the 3D laser leveler 30, the joining bracket 20 and the beam leveler 10 is in use on a horizontal surface 100, position of the 3D laser leveler 30 along the joining bracket 20 is adjusted using the holding mechanism (i.e., the screws 211). The rotator 31 is then rotated to a desired angle and then a spanning plane laser beam 40 can be emitted to locate a horizontal line 401 on a projected vertical surface 200 that is perpendicular to the longitudinal direction of the beam leveler 10. Further rotation of the rotator 31 will generate a series of parallel lines on the projected surface 200.

It is apparent in FIG. 3A that the spanning plane laser beam 40 rotates with the rotator 31 to a surface parallel to the base plane 320. In another embodiment of the spanning plane laser beam shown in FIG. 3B, the spanning plane laser beam 40a can be perpendicular to the base plane 320 of the base block 32. This can be achieved by rotating the laser unit 313 by 90 degree while assembling the 3D laser leveler 30. As shown in FIG. 3B, a vertical line 421 can be generated after the spanning plane laser beam 40a is projected onto the vertical surface 200. By rotating the rotator 31 further, the vertical line 421 can be extended in either direction.

Figure 4:
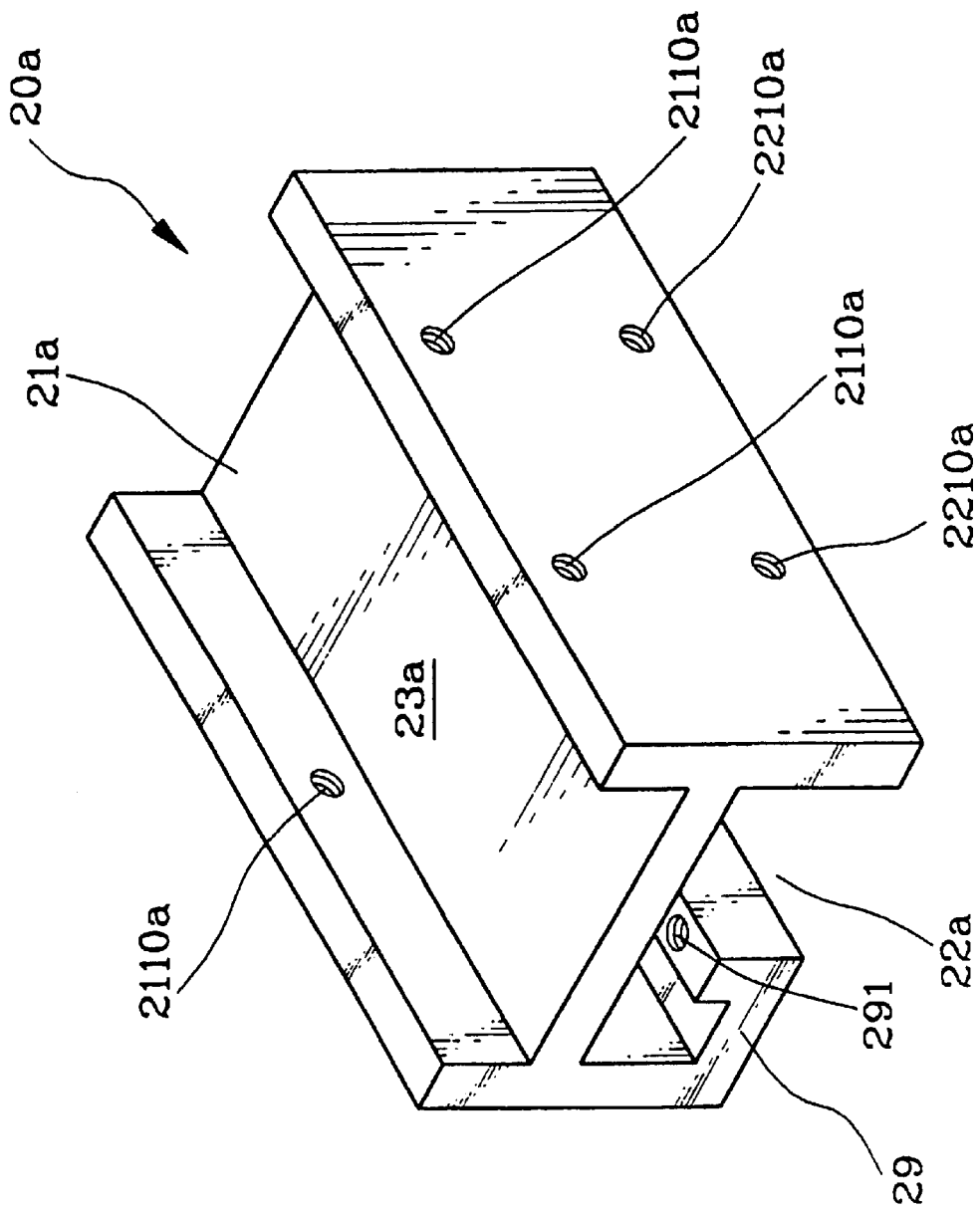
FIG. 4 is a perspective view of another embodiment of the joining bracket for the combination of FIG. 2.

FIG. 4 illustrates another embodiment of a joining bracket 20a that can be used with the combination of FIG. 2. The elements of the joining bracket 20a that are the same as the elements of the joining bracket 20 of FIG. 2 are provided with the same numeral designations except that an "a" has been added to the numeral designations in FIG. 2. As shown in FIG. 4, the joining bracket 20a can further include an inward flange 29 that extends inwardly from one side wall of the lower groove 22a. Preferably, the inward flange 29 further includes a plurality of vertical third through screw holes 291 for receiving adjustable screws. These screws can then be used to secure the joining bracket 20a to a desired position along the top horizontal surface or an extending edge of beam levelers having I-shape cross sections, T-shape cross sections, or any type of cross section with extending edge.

Thus, the 3D laser leveler 30 of the present invention provides for the effective and accurate extension of straight lines and planes (either parallel or perpendicular) from a reference line or plane. The use of a laser beam allows the extension to be along any distance, ranging from short to long distances.

While the present invention has been particularly shown and described with reference to preferred embodiments, it will be understood by those skilled in the art that various changes in form and detail may be without departing from the spirit and scope of the present invention.

What is claim is:

1. In combination:
   (a) a 3D laser leveler having:
      (i) a base block having a base plane that is adapted to be rested on a flat surface, the base block having a pivot mechanism; and
      (ii) a rotator rotatably coupled to the pivot mechanism and rotatable thereabout, the rotator having:
         a housing defining an internal space and a laser through hole;
         a battery provided inside the internal space; and
         a laser unit coupled to the battery and positioned inside the
      internal space for emitting the laser beams through the laser through hole.
   (b) a joining bracket having an upper groove for receiving the base block and a lower groove for coupling to a leveling device; the upper groove having an adjustable holding mechanism for adjusting the position of the 3D laser leveler therein.

2. The combination according to claim 1, wherein the lower groove of the joining bracket has a vice mechanism for coupling the leveling device.

3. The combination according to claim 2, wherein the vice mechanism includes a plurality of adjustable screws.

4. The combination according to claim 1, wherein the base block further includes a first leveling unit for examining the level status of the base plane.

5. The combination according to claim 1, wherein the rotator housing further includes a battery through hole through which the battery may be inserted into the internal space.

6. The combination according to claim 5, wherein the rotator further includes a switch through hole, and a switch which extends through the switch through hole for engaging and disengaging the laser unit from the battery.

7. The combination according to claim 1, wherein the rotator housing further includes a pivot mechanism that is rotatably coupled to the pivot mechanism of the base block.

8. The combination according to claim 1, wherein the rotator further includes a second leveling unit.

9. The combination according to claim 1, wherein the laser beam is a spanning plane laser beam that is perpendicular to the base plane.

10. The combination according to claim 9, wherein the spanning plane laser beam is rotatable with the rotator to a position that the spanning plane laser beam is parallel to the base plane.

11. The combination according to claim 1, wherein the joining bracket is a beam with an H-shape cross section, providing the upper groove thereof at the upper cavity of the H shape and providing the lower groove thereof at the lower cavity of the H shape.

12. The combination according to claim 11, wherein the joining bracket includes an inward flange at one side of the lower groove, and the inward flange further includes a plurality of vertical through holes for receiving adjustable screws.

13. The combination according to claim 1, wherein the adjustable holding mechanism includes a plurality of adjustable screws.

* * * * *